(12) United States Patent
Takahashi et al.

(10) Patent No.: US 7,114,044 B2
(45) Date of Patent: Sep. 26, 2006

(54) STORAGE SYSTEM, METHOD OF CONTROLLING STORAGE SYSTEM, AND STORAGE DEVICE

(75) Inventors: Masamitsu Takahashi, Chigasaki (JP); Takao Satoh, Odawara (JP); Koji Ozawa, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/823,618

(22) Filed: Apr. 14, 2004

(65) Prior Publication Data
US 2005/0050288 A1    Mar. 3, 2005

(30) Foreign Application Priority Data
Sep. 1, 2003    (JP) ............................ 2003-309194

(51) Int. Cl.
*G06F 12/00* (2006.01)
(52) U.S. Cl. ..................................... 711/154
(58) Field of Classification Search ..................... None
See application file for complete search history.

(56) References Cited

U.S. PATENT DOCUMENTS

| | | | |
|---|---|---|---|
| 5,799,323 A | 8/1998 | Mosher, Jr. et al. | |
| 5,835,953 A * | 11/1998 | Ohran | 711/162 |
| 5,937,414 A | 8/1999 | Souder et al. | |
| 6,101,497 A | 8/2000 | Ofek | |
| 6,643,750 B1 | 11/2003 | Achiwa et al. | |
| 6,671,705 B1 | 12/2003 | Duprey et al. | |
| 6,898,685 B1 | 5/2005 | Meiri et al. | |
| 6,922,763 B1 | 7/2005 | Suzuki et al. | |
| 2001/0007102 A1 | 7/2001 | Gagne et al. | |
| 2002/0059505 A1 | 5/2002 | St. Pierre et al. | |
| 2002/0103816 A1 | 8/2002 | Ganesh | |
| 2003/0051111 A1 | 3/2003 | Nakano et al. | |
| 2003/0229764 A1 | 12/2003 | Ohno et al. | |
| 2004/0098547 A1 | 5/2004 | Ofek et al. | |
| 2004/0139128 A1 | 7/2004 | Becker et al. | |
| 2004/0193802 A1 | 9/2004 | Mieri et al. | |
| 2004/0193816 A1 | 9/2004 | Mieri et al. | |
| 2004/0230859 A1 * | 11/2004 | Cochran et al. | 714/2 |
| 2004/0260736 A1 | 12/2004 | Kern | |
| 2005/0050267 A1 | 3/2005 | Yamamoto | |
| 2005/0060507 A1 | 3/2005 | Kasako | |
| 2005/0066122 A1 | 3/2005 | Longinov et al. | |
| 2005/0071393 A1 | 3/2005 | Ohno | |

(Continued)

FOREIGN PATENT DOCUMENTS

EP    1 058 190    12/2000

(Continued)

*Primary Examiner*—Mano Padmanabhan
*Assistant Examiner*—Duc T Doan
(74) *Attorney, Agent, or Firm*—Mattingly, Stanger, Malur & Brundidge, P.C.

(57) ABSTRACT

The present invention provides a storage system and a method of controlling the storage system, in which a second site rapidly resumes system process when a first site is damaged. The storage system comprises a first site including a first storage device, a second site including a second storage device, and a third site including a third storage device, and the method of controlling the storage system comprises a step of making a logical volume of the second storage device consistent with a logical volume of the first storage device by remotely copying only the differential data between the logical volume of the first storage device and the logical volume of the second storage device from a logical volume of the third storage device to the logical volume of the second storage device when the first site is damaged.

49 Claims, 12 Drawing Sheets

U.S. PATENT DOCUMENTS

| | | |
|---|---|---|
| 2005/0120056 A1 | 6/2005 | Mieri et al. |
| 2005/0120093 A1 | 6/2005 | Nakano |
| 2005/0132248 A1 | 6/2005 | LeCrone et al. |
| 2005/0188254 A1 | 8/2005 | Urabe |
| 2005/0198454 A1 | 9/2005 | Yonder et al. |

FOREIGN PATENT DOCUMENTS

| | | |
|---|---|---|
| EP | 1255198 | 11/2002 |
| EP | 1 283 469 | 2/2003 |
| JP | 2003131917 | 5/2003 |

* cited by examiner

FIG. 5

Shared memory — 104

Consistency group management table — 200

| Consistency group number | Split start time | Differential delete time |
|---|---|---|
| 0 | 12:00 | - |
| 1 | - | - |
| 2 | - | - |
| 3 | - | - |
| ... | ... | ... |

Pair management table — 201

| Type of pair | Copy manner | Copy source device | Copy destination device | Copy source volume | Copy destination volume | Pairing status | Consistency group |
|---|---|---|---|---|---|---|---|
| Local | - | - | - | 0 | 2 | Under pair | 0 |
| Local | - | - | - | 1 | 3 | Under pair | 0 |
| Remote | Asynchronous | First | Second | 0 | 0 | Under split | 0 |
| ... | ... | ... | ... | ... | ... | ... | ... |

Differential management table — 202

| Volume 0 | Volume 1 | Volume 2 | Volume 3 | Volume 4 |
|---|---|---|---|---|
| 0110001100011 | 10011100101 | 1111101010100 | 0100101010010 | 0000000000010 |
| 1000110100010 | 01000101001 | 1010101110101 | 1010101011111 | 1111101000001 |
| 0000010010101 | 00101100101 | 0010111101110 | 0001010101010 | 0101110101001 |
| 1001... | 0011... | 1000... | 0010... | 0010... |
| ... | ... | ... | ... | ... |

FIG. 6

Pair management table of each storage device

First storage device

| Type of pair | Copy manner | Copy source device | Copy destination device | Copy source volume | Copy destination volume | Pairing status | Consistency group |
|---|---|---|---|---|---|---|---|
| Local | – | – | – | 0 | 2 | Under pair | 0 |
| Local | – | – | – | 1 | 3 | Under pair | 0 |
| ... | ... | ... | ... | ... | ... | ... | ... |
| Remote | Asynchronous | First | Second | 0 | 0 | Under split | 1 |
| Remote | Asynchronous | First | Second | 1 | 1 | Under split | 1 |
| ... | ... | ... | ... | ... | ... | ... | ... |
| Remote | Synchronous | First | Third | 0 | 0 | Under pair | 0 |
| Remote | Synchronous | First | Third | 1 | 1 | Under pair | 0 |
| ... | ... | ... | ... | ... | ... | ... | ... |

~201

Second storage device

| Type of pair | Copy manner | Copy source device | Copy destination device | Copy source volume | Copy destination volume | Pairing status | Consistency group |
|---|---|---|---|---|---|---|---|
| Remote | Asynchronous | First | Second | 0 | 0 | Under split | 1 |
| Remote | Asynchronous | First | Second | 1 | 1 | Under split | 1 |
| ... | ... | ... | ... | ... | ... | ... | ... |

~201

Third storage device

| Type of pair | Copy manner | Copy source device | Copy destination device | Copy source volume | Copy destination volume | Pairing status | Consistency group |
|---|---|---|---|---|---|---|---|
| Remote | Synchronous | First | Third | 0 | 0 | Under pair | 0 |
| Remote | Synchronous | First | Third | 1 | 1 | Under pair | 0 |
| ... | ... | ... | ... | ... | ... | ... | ... |

~201

STORAGE SYSTEM, METHOD OF CONTROLLING STORAGE SYSTEM, AND STORAGE DEVICE

CROSS-REFERENCES TO RELATED APPLICATIONS

This application relates to and claims priority from Japanese Patent Application No. 2003-309194, filed on Sep. 1, 2003, the entire disclosure of which is incorporated herein by reference.

BACKGROUND OF THE INVENTION

1. Field of the Invention

The present invention relates to a storage system and a method of controlling the same.

2. Description of the Related Art

Disaster recovery is important in an information-processing system. As a technique for recovery from a disaster, the standard technique is known to store and manage a copy of the data on a storage device at a primary site by a storage device located at a remote site (hereinafter, this technique is referred to as 'remote copy'). According to this technique, when the primary site is damaged, processes performed at the primary site are continuously performed at the remote site by using data in the storage device located at the remote site.

In the above-described method, in order to continue to perform the process that was being performed at the primary site at the remote site when the primary site is damaged, it is necessary to perform a remote copy from the primary site to the remote site in real time. However, the primary site and the remote site are often separated distantly from each other. Therefore, if the remote copy from the primary site to the remote site is performed in real time, it takes a considerable amount of time for data communication, and the processing performance of the primary site is decreased. In an information-processing system required for high availability (HA), the processing performance of the primary site should not be decreased, and the process should be rapidly resumed at the remote site when the primary site is damaged.

SUMMARY OF THE INVENTION

The present invention is designed to solve the aforementioned problem, and it is an object of the present invention to provide a storage system and a method of controlling the same.

To achieve this object, there is provided a method of controlling a storage system comprising a first storage device having a first storage volume provided at a first site, a second storage device having a second storage volume provided at a second site, and a third storage device having a third storage volume provided at a third site, the storage devices being connected so as to communicate with each other, wherein the method includes the steps of: storing a copy of data stored in the first storage volume in the second storage volume at a first time; writing the copy of data written in the first storage volume into the third storage volume; storing, in the third storage device, a write history of the data written in the first storage volume as a first differential management table after the first time; and allowing the third storage device to make the contents of the data stored in the second storage volume consistent with the contents of the data stored in the first storage volume using the first differential management table and the third storage volume of the third storage device.

Here, in an information-processing system in which a first site is a primary site, a second site is a remote site, and a third site is a local site provided in the vicinity of the first site, it becomes possible to make the second storage volume consistent with the first storage volume by remotely copying only the differential data between the first storage volume and the second storage volume from the third storage volume to the second storage volume when the first site is damaged.

Therefore, it is possible to provide a storage system and a method of controlling the storage system having the above effects.

BRIEF DESCRIPTION OF THE DRAWINGS

FIG. 5 is a diagram illustrating a table stored in a shared memory in a storage device according to the present embodiment;

FIG. 6 is a diagram illustrating a pair management table according to the present embodiment;

DESCRIPTION OF THE EMBODIMENT

Configuration of Information-Processing System

Figure 1:
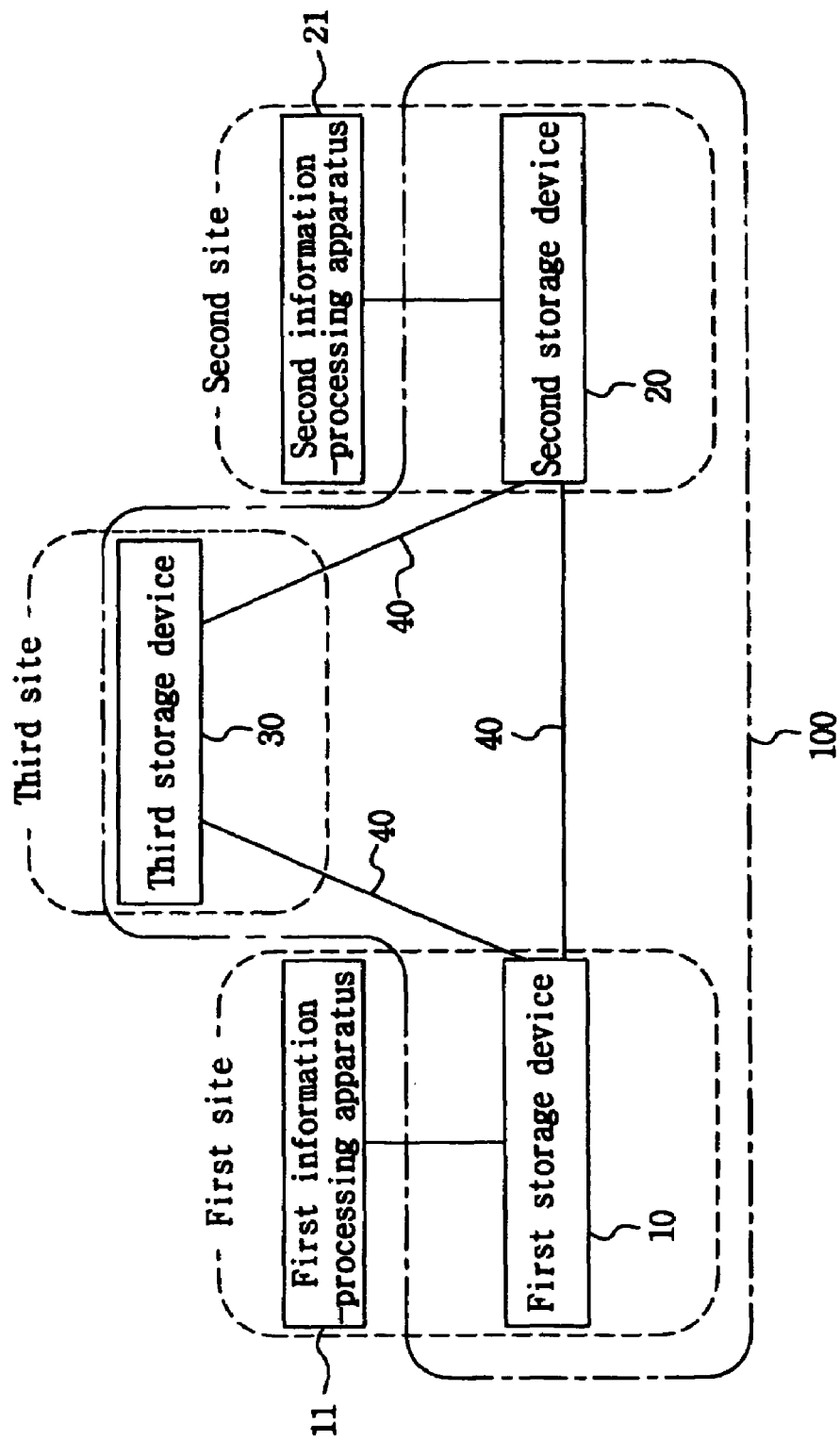
FIG. 1 is a diagram illustrating a schematic configuration of an information-processing system according to the present embodiment.

FIG. 1 is a block diagram illustrating the entire configuration of an information-processing system including a storage system 100 according to the present embodiment.

The information-processing system comprises a storage device, or storage system 10 (hereinafter, referred to as 'a first storage device' or 'first storage system') provided at a first site, an information-processing apparatus 11 (hereinafter, referred to as 'a first information-processing apparatus') accessing the first storage device, a storage device, or storage system 20 (hereinafter, referred to as 'a second storage device' or 'second storage system') provided at a second site, an information-processing apparatus 21 (hereinafter, referred to as 'a second information-processing apparatus') accessing the second storage device, and a storage device, or storage system 30 (hereinafter, 'a third storage device' or 'third storage system') provided at a third site. As a detailed example of each of the sites, this could be a computer facility operated by an organization, such as a university or corporation, or a data center in which an operation of a web server on the Internet or an operation of ASP (Application Service Provider) is performed. The information-processing system is built for disaster recovery in the event of an earthquake, fire, typhoon, flood, lightning, act of terrorism, and the like. This is described in detail in U.S. patent application Ser. No. 10/096,375. The U.S. patent application Ser. No. 10/096,375 is included herein by reference.

In this embodiment, the first site is the above-described primary site, the second site is the above-described remote site, and the third site is the above-described local site.

The storage devices 10, 20, and 30 provided at the respective sites are connected so as to communicate with each other via a first network 40. The first network 40 is, for example, the Gigabit Ethernet (a registered trademark), an asynchronous transfer mode (ATM), a public line, and the like.

Each of the information-processing apparatuses 11 and 21 is a computer comprising a central processing unit (CPU) and a memory, such as a personal computer (PC), a workstation, or a main frame. Each of the information-processing apparatuses 11 and 21 may be composed of a plurality of computers connected to each other. In each of the information-processing apparatuses 11 and 21, an operating system is in use. Application software is operated through the operating system.

For example, the application software could provide a function of an automatic teller system of a bank or a seat reservation system of an airplane. The information-processing apparatuses 11 and 21, and the storage devices 10 and 20 in the first site and the second site are interconnected by communication means (e.g., a communication line and a network), respectively. The communication means is, for example, a local area network (LAN), a storage area network (SAN), an Internet Small Computer System Interface (ISCSI), a fibre channel, an Enterprise Systems Connection (ESCON) (a registered trademark), a Fibre Connection (FICON) (a registered trademark), and the like.

Figure 2:
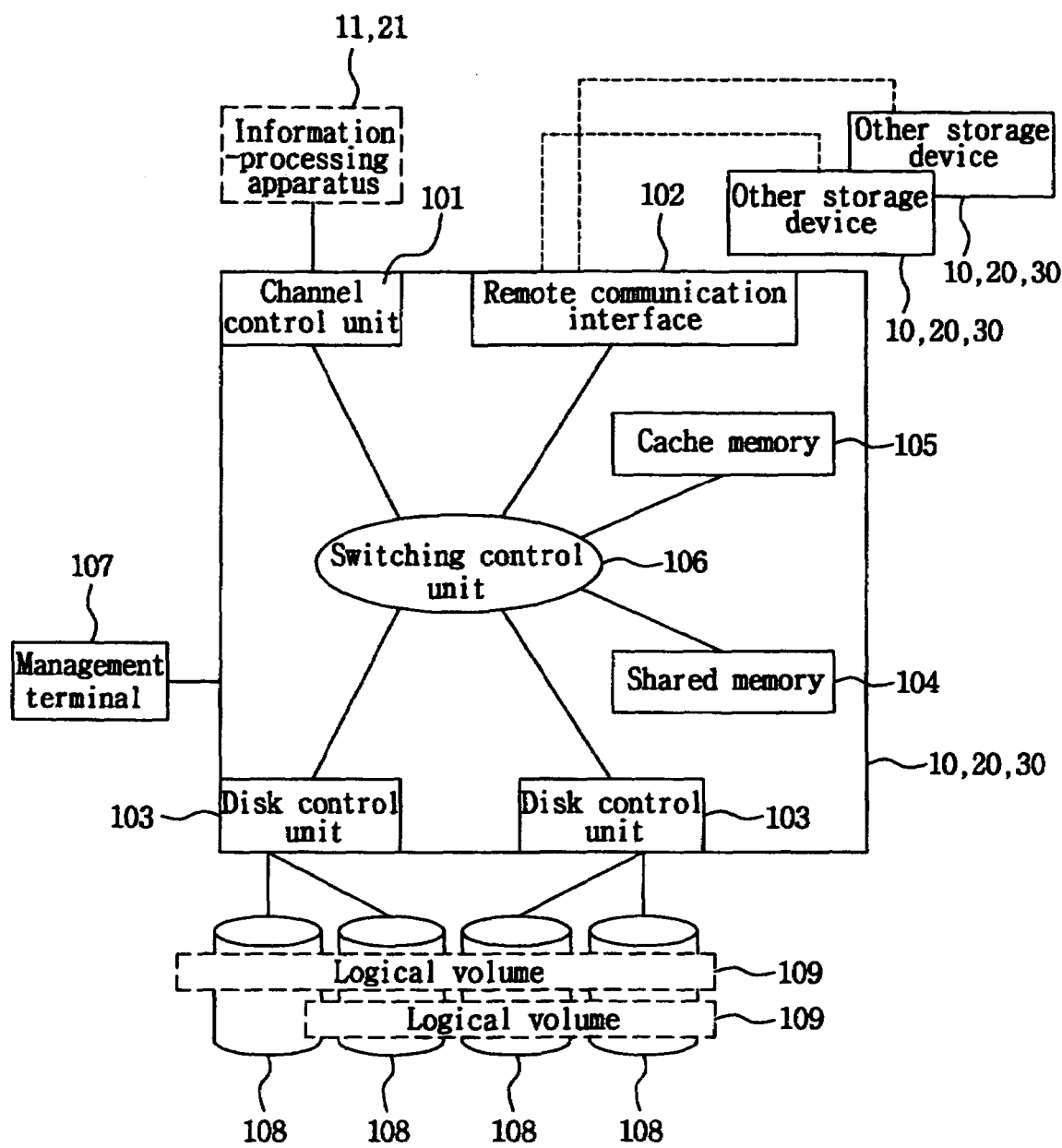
FIG. 2 is a diagram illustrating a configuration of a disk array device according to the present embodiment.

FIG. 2 shows the detailed configuration of a disk array device described as one example of the first to third storage devices 10, 20, and 30. Further, the first to third storage devices 10, 20, and 30 may be, for example, semiconductor storage devices, in addition to the disk array devices. The disk array device comprises a channel control unit 101, a remote communication interface 102, a disk control unit 103, a shared memory 104, a cache memory 105, a switching control unit 106, which is composed of, for example, a crossbar switch, for connecting the above components such that they can communicate with each other, a management terminal 107, and a plurality of storages, or disk devices 108.

The cache memory 105 is mainly used to temporarily store data communicated between the channel control unit 101 and the disk control unit 103. For example, if data input/output commands received from the information-processing apparatuses 11 and 21 by the channel control unit 101 are write commands, the channel control unit 101 writes write data received from the information-processing apparatuses 11 and 21 into the cache memory 105. Further, the disk control unit 103 reads out the write data from the cache memory 105 and writes it into the storage 108.

The disk control unit 103 reads out data input/output (I/O) requests which are written into the shared memory 104 by the channel control unit 101, and writes or reads data into or from the storage 108 according to commands (e.g., commands of SCSI (Small Computer System Interface) standards) set up in the data I/O requests. The disk control unit 103 writes the data read out from the storage 108 into the cache memory 105. Further, the disk control unit 103 transmits notice of the completion of data write or data read to the channel control unit 101. The disk control unit 103 may have a function for controlling the storages 108 in a RAID (Redundant Array of Inexpensive Disks) level (e.g., 0, 1, 5) defined in a so-called RAID manner.

The storage 108 is, for example, a hard disk device. The storage 108 may be integrated with the disk array device or may be independently provided therefrom. A storage area provided by the storage device 108 at each site is managed using a logical volume 109, which is a volume logically set up in the storage area, as a unit. Writing or reading data into or from the storage 108 can be performed by designating an identifier, which is given to the logical volume 109.

The management terminal 107 is a computer for maintaining and managing the disk array device or the storage 108. The change of software or parameters carried out in the channel control unit 101 or the disk control unit 103 is performed by the instructions from the management terminal 107. The management terminal 107 may be built in the disk array device or may be separately provided therefrom.

The remote communication interface 102 is a communication interface (a channel extender) for data communication with other storage devices 10, 20, and 30, and data duplicated by a remote copy, which will be described later, is transmitted via the remote communication interface 102. The remote communication interface 102 converts an interface (e.g., an interface, such as a Fibre Channel, an ESCON (a registered trademark), or a FICON (a registered trademark)) of the channel control unit 101 into a communication method for the first network 40. It allows data transmission between the storage devices 10, 20, and 30.

Further, the disk array device may be, for example, a device functioning as a NAS (Network Attached Storage) that is configured to accept data input/output requests according to file name designation from the information-processing apparatuses 11 and 21 by a protocol, such as an NFS (Network File System), in addition to a device having the above-stated configuration.

The shared memory 104 is accessible by both the channel control unit 101 and the remote communication interface 102, and the disk control unit 103. The shared memory is used to deliver data input/output request commands and also stores management information for the storage devices 10, 20, and 30 or the storage device 108. In this embodiment, a consistency group management table 200, a pair management table 201, and a differential management table 202 are stored in the shared memory 104, as shown in FIG. 5.

Figure 3:
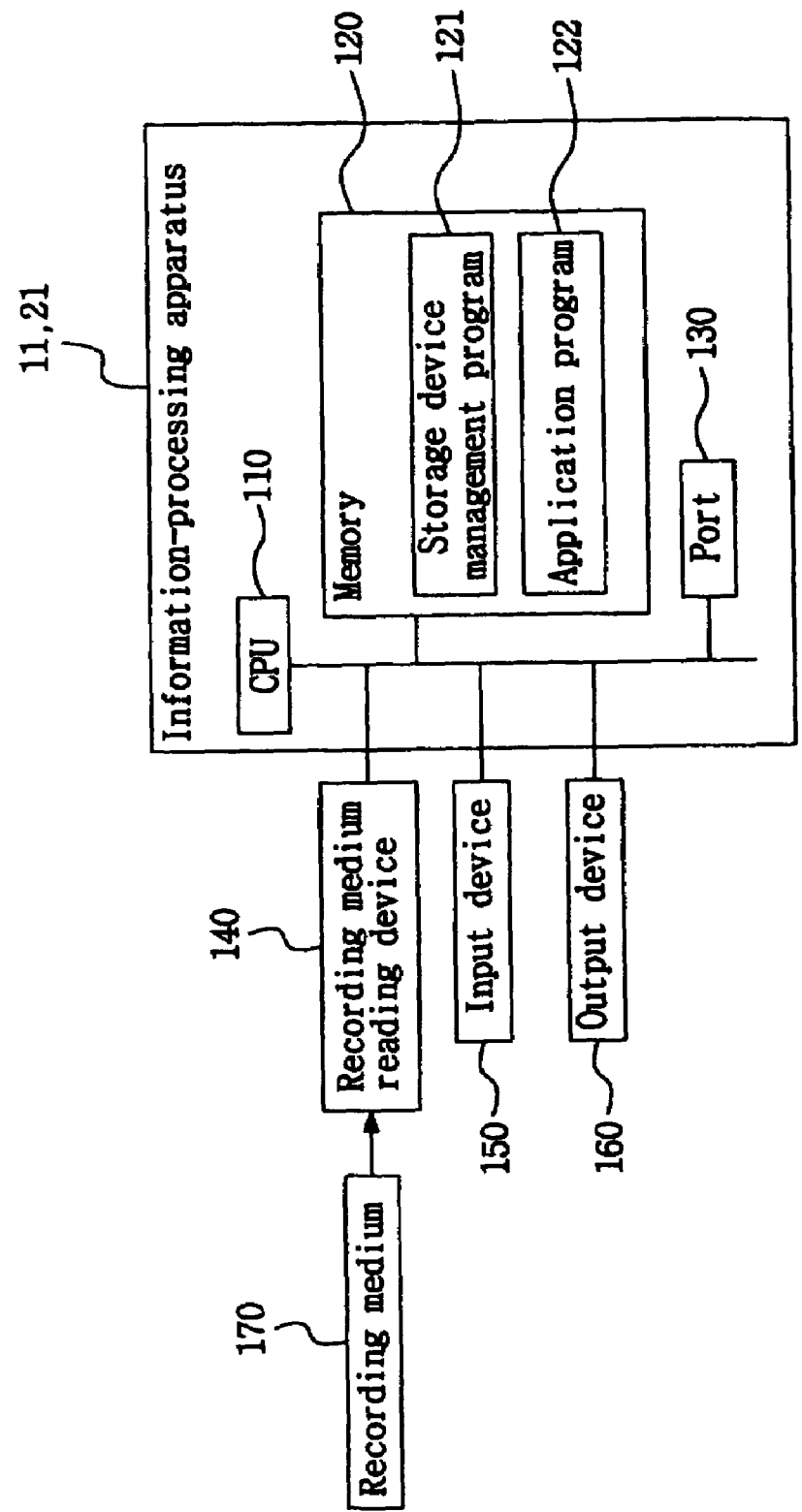
FIG. 3 is a diagram illustrating a configuration of an information-processing apparatus according to the present embodiment.

FIG. 3 is a block diagram illustrating the configuration of the information-processing apparatuses 11 and 21.

The information-processing apparatuses 11 and 21 each comprise a CPU 110, a memory 120, a port 130, a recording medium reading device 140, an input device 150, and an output device 160.

The CPU 110 is in charge of the control of the entire information-processing apparatuses 11 and 21, and realizes various functions by executing programs stored in the memory 120. The recording medium reading device 140 is a device for reading out programs or data recorded on a recording medium 170. The read programs or data are stored in the memory 120. Thus, for example, it is possible to read a storage device management program 121 or an application program 122, which is recorded on the recording medium 170, from the recording medium 170 using the recording medium reading device 140 and to store it in the memory 120. As the recording medium 170, a flexible disk, a CD-ROM, a semiconductor memory, and the like may be used. The recording medium reading device 140 may be built in the information-processing apparatuses 11 and 21 or may be separately provided therefrom. For example, the input device 150 is used for inputting data into the information-processing apparatuses 11 and 21 by an operator. As the input device 150, for example, a keyboard, a mouse, and the like are used. The output device 160 is a device for outputting information to the outside. As the output device 160, for example, a display, a printer, and the like are used. The port 130 is a device for communicating with the storage devices 10, 20, and 30. Further, the port 130 may be used for communication between the information-processing apparatuses 11 and 21. In this case, for example, the storage device management program 121 or the application program 122 may be received from the information-processing apparatuses 11 and 21 via the port 130 and may be stored in the memory 120.

The storage device management program 121 is a program for performing the copy management of the data stored in the logical volume 109 that is included in the storage 108. Various commands for performing the copy management are transmitted to the storage devices 10, 20, and 30 to allow the copy management operation to be performed.

The application program 122 is a program for making the information-processing apparatus 11 and 21 execute various functions. For example, there are a function for realizing the above-stated automatic teller system of the bank, a function for realizing the seat reservation system of the airplane, and the like.

Figure 4:
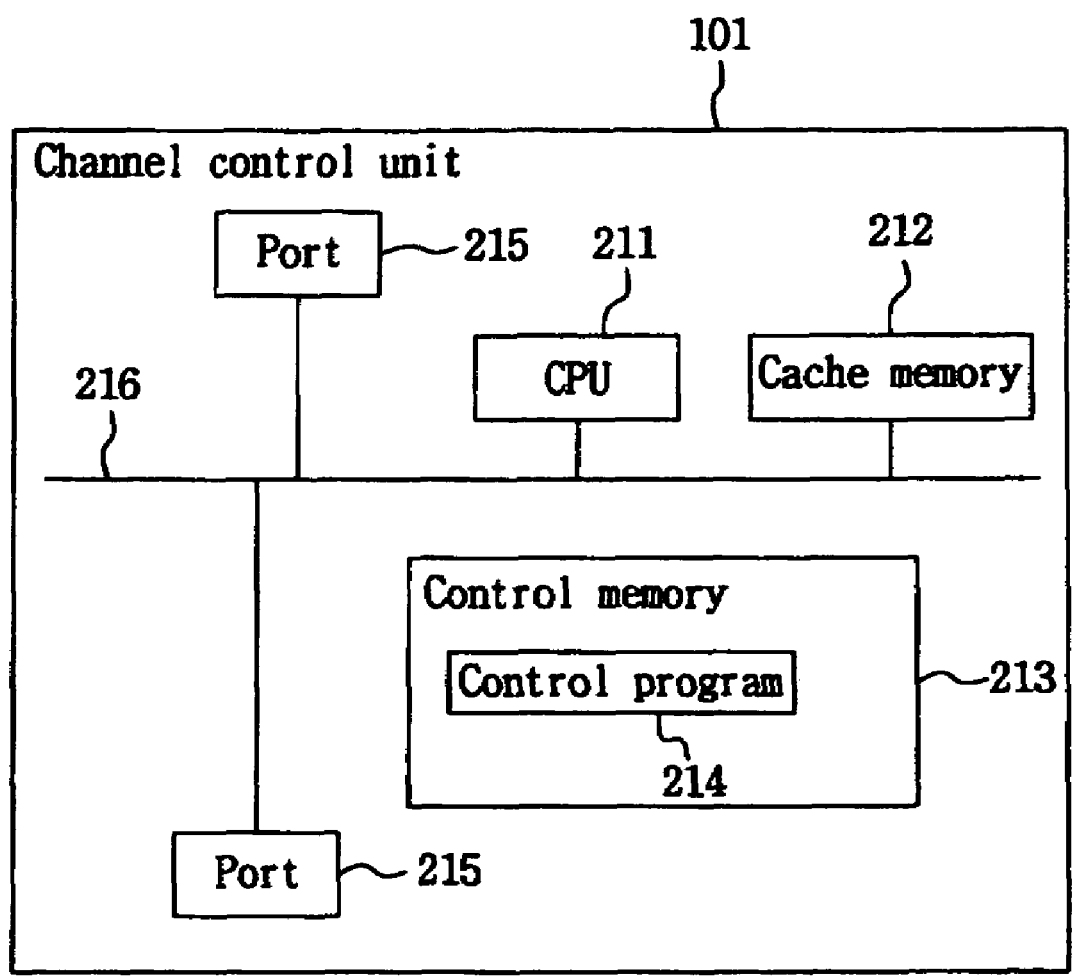
FIG. 4 is a diagram illustrating a configuration of a channel control unit in a storage device according to the present embodiment.

FIG. 4 is a block diagram showing the configuration of the channel control unit 101.

The channel control unit 101 comprises a CPU 211, a cache memory 212, a control memory 213, a port 215, and a bus 216.

The CPU 211 is in charge of the control of the entire channel control unit 101 and executes a control program 214 stored in the control memory 213. The copy management of data according to the present embodiment is realized as the control program 214 stored in the control memory 213 is executed. The cache memory 212 is a memory for temporarily storing data, commands, and the like, which are communicated with the information-processing apparatuses 11 and 21. The port 215 is a communication interface for communicating with the information-processing apparatuses 11 and 21 or for communicating with other devices in the storage devices 10, 20, and 30. The bus 216 connects these devices to each other.

[Pair Management Table]

A pair management table 201 is a copy management table of the logical volume 109 of each of the storage devices 10, 20, and 30. The pair management table 201 comprises 'type of pair', 'copy manner', 'copy source device', 'copy destination device', 'copy source volume', 'copy destination volume', 'paring status', and 'consistency group' columns.

A pair refers to a combination of logical volumes 109 formed by two logical volumes 109. Further, a case in which two logical volumes 109 forming a pair are in the same storage devices 10, 20 and 30 is called a 'local pair', and a case in which they are in different storage devices 10, 20 and 30 is called a 'remote pair'. Of the logical volumes 109 forming a pair, one is a main logical volume, and the other is a secondary logical volume. It is possible to combine a plurality of secondary logical volumes with one main logical volume.

If the information-processing apparatuses 11 and 21 instruct the copy source storage devices 10, 20, and 30 to form remote pairs, each of the copy source storage devices 10, 20, and 30 update the pair management table 202 of the shared memory 104 in each of the copy source storage devices 10, 20, and 30. Thereafter, the copy source storage devices 10, 20, and 30 instruct the copy destination storage devices 10, 20, and 30 to form the remote pairs. The copy source storage devices 10, 20, and 30 having received the instruction update the pair management tables 202 of the shared memories 104 in the copy destination storage devices 10, 20, and 30.

The column 'type of pair' in the pair management table 201 represents whether the pair is a local pair or a remote pair. The column 'copy manner' represents whether a remote copy manner is a synchronous manner or an asynchronous manner when the pair is the remote pair. Further, the remote copy and the manner thereof will be described later. The columns 'copy source device' and 'copy destination device' represent the storage devices 10, 20, and 30 of the copy source and the storage devices 10, 20, and 30 of the copy destination when the pair is the remote pair. The column 'copy source volume' represents a main logical volume of the pair, and the column 'copy destination volume' represents a secondary logical volume of the pair.

The column 'state of pair' represents the state of the pair. As the state of the pair, there are 'under pair', 'under split', and 'under resynchronization'.

In case of the 'under pair', data written into the main logical volume from the information-processing apparatuses 11 and 21 is reflected to the secondary logical volume. Thus, it is possible to surely equalize the contents stored in the main logical volume with the contents stored in the secondary logical volume by matching the main logical volume to the secondary logical volume.

In case of the 'under split', even though data is written from information-processing apparatuses 11 and 21 into the main logical volume, the data is not reflected to the secondary logical volume. That is, the 'under split' state is a state in which the correspondence between the main logical volume and the secondary logical volume at the 'under pair' is released. Thus, the identification between the contents of the main logical volume and the contents of the secondary logical volume is not secured. However, since the contents of the secondary logical volume are not updated in the 'under split' state, the data can be backed up at this time.

The 'under resynchronization' is a state in the course of shifting from the 'under split' to the 'under pair'. That is, in the 'under split', the data update performed on the main logical volume is being reflected to the secondary logical volume. If the reflection is completed, the state of the pair becomes the 'under pair'. Further, shifting the pair from the state of the 'under split' to the state of the 'under pair' is called pair re-forming.

The formation of a pair, the split of a pair, and the re-formation of a pair are performed by the operator inputting instructions from the input device 150 to the information-processing apparatuses 11 and 21 in which the storage device management program 121 is executed. The instructions input by the operator are transmitted to the channel control units 101 in the storage devices 10, 20, and 30. Then, the channel control unit 101 executes the control program 214 to perform the formation of the pair or a change of the state of the pair according to the instructions. The channel control unit 101 performs the control of the logical volume 109 according to the pairing status of the formed pair. For example, the channel control unit 101 reflects the copy of the updated data of the main logical volume to the secondary logical volume with respect to the pair in the 'under pair' state.

The change of the pairing status by the channel control unit 101 is sequentially performed on each pair. The reason is that, for example, in a state in which a pair is formed by combining a plurality of secondary logical volumes with one main logical volume as described above, when a plurality of pairing conditions is simultaneously changed, management for the main logical volume is complicated.

Further, while the formation of a pair or the shift of a paring status is initiated by the instructions received by information-processing apparatuses 11 and 21 from the operator, the shift of the paring status may be automatically performed, for example, when a predetermined time elapses without instructions from the operator. In addition, the formation of a pair or the shift of a paring status may be performed by receiving instructions from the information-processing apparatuses 11 and 21 connected via the port 215.

In this embodiment, a pair is set up as shown in the pair management table of FIG. 6. That is, the logical volume 109 (hereinafter, referred to as 'a first logical volume') at the first site forms a local pair. Further, the secondary logical volume (hereinafter, referred to as 'a first secondary logical volume') of the local pair of the first logical volume and the logical volume 109 (hereinafter, referred to as 'a second logical volume') at the second site form a remote pair. The remote pair of the first main logical volume and the logical volume 109 (hereinafter, referred to as 'a third logical volume') at the third site is always in the 'under pair' state, and the third logical volume is always consistent with the first main logical volume by the remote copy in a synchronous manner, which will be described later.

Further, data backup from the first logical volume to the second logical volume is performed as follows. First, the first storage device 10 shifts the local pair of the first logical volume to the 'under split' by the instructions from the first information-processing apparatus 11. When split is completed, the first storage device 10 re-forms the remote pair of the first secondary logical volume and the second logical volume according to the instructions from the first information-processing apparatus 11. Further, the first information-processing apparatus can continue to perform the process using a main logical volume (hereinafter, referred to as 'a first main logical volume') of the local pair of the first logical volume during the re-formation of the remote pair.

[Consistency Group]

The number of a consistency group (i.e., a pair group) to which the pair belongs is written into the column 'consistency group' of the paring status management table 201. Here, a consistency group refers to a group formed of pairs of a plurality of logical volumes 109, which is controlled so that the shift to the split state thereof is simultaneously made. That is, a change of the paring status with respect to the plurality of pairs is sequentially performed on each pair as described above. However, a plurality of pairs belonging to the same consistency group is controlled such that the shift to the split state thereof is simultaneously performed (hereinafter, it is referred to as simultaneity of the shift to the split state).

For example, a case is considered in which data is written from the information-processing apparatuses 11 and 21 to the storage devices 10, 20, and 30 while the storage devices 10, 20, and 30 sequentially change a plurality of pairs belonging to the same consistency group from the 'under pair' to the 'under split'. If the consistency group has not been formed, the write data is not reflected to the secondary logical volume when the data writing is intended with respect to the main logical volume of the pair the shift to the split state of which is completed. On the contrary, if the data writing is intended with respect to the main logical volume of the pair the shift to the split state of which is not completed, the write data is reflected to the secondary logical volume. However, when the consistency group has been formed, the write data is not reflected to the secondary logical volume, regardless of whether the shift to the split state is completed. This is because the data writing from the processing devices 11 and 21 to the storage devices 10, 20, and 30 is called after the split for the pair of the consistency group has been initiated (the release of correspondence is initiated).

As described above, forming a consistency group with respect to a plurality of pairs is particularly effective when one data item is stored in the plurality of logical volumes 109, for example, when the write data is too large to be stored in one logical volume 109, and when one file data item is controlled so that it is stored in the plurality of logical volumes 109.

In addition, securing simultaneity for the shift of each pair to the split state using the consistency group is effective even when there is a data write request or a data read request from the information-processing apparatuses 11 and 21 to the secondary logical volume.

That is, the reason is that, when the consistency group has not been formed, data writing or data reading can be performed with respect to a secondary logical volume of the pair the shift to the split state of which is completed, but data writing or data reading is prohibited with respect to a secondary logical volume of the pair the shift to the split state of which is not completed.

Further, a split for a pair of the consistency group may be performed by designating the start time thereof. The start time of the split is instructed by a command transmitted from the information-processing apparatuses 11 and 21.

[Remote Copy]

When the above-stated remote pairs are formed in the logical volumes 109 of the first to third storage devices 10, 20, and 30, the copy source storage devices 10, 20, and 30 transmit data copied by the remote copy to the copy destination storage devices 10, 20, and 30. The corresponding relationship between the main logical volumes of the copy source storage devices 10, 20, and 30 and the secondary logical volumes of the copy destination storage devices 10, 20, and 30 is set up in the above-stated pair management table 201. When the information-processing apparatuses 11 and 21 write data to the main logical volumes of the copy source storage devices 10, 20, and 30 while the paring status is the 'under pair', the copy source storage devices 10, 20, and 30 transmit the copy of the data to the copy destination storage devices 10, 20, and 30 via the first network 40. Then, the copy destination storage devices 10, 20, and 30 write the received data to the secondary logical volumes. While the pairing status is 'under split', the copy source storage devices 10, 20, and 30 do not transmit the copy of the data to the copy destination storage devices 10, 20, and 30 even when the information-processing apparatuses 11 and 21 write data to the main logical volumes of the copy source storage devices 10, 20, and 30. The copy source storage devices 10, 20, and 30 transmit the copy of the data to the copy destination storage devices 10, 20, and 30 at the timing when the paring status is shifted to the 'under resynchronization', and then the copy destination storage devices 10, 20, and 30 write the received data to the secondary logical volumes. That is, the remote copy is performed to make the contents of the main logical volumes of the copy source storage devices 10, 20, and 30 consistent with the contents of the secondary logical volumes of the copy destination storage devices 10, 20, and 30, wherein the copy source storage devices 10, 20, and 30 correspond to the copy destination storage devices 10, 20, and 30.

Further, the remote copy manner includes a synchronous manner and an asynchronous manner, which are determined in the 'copy manner' column of the differential management table 202. In the case of the synchronous manner, if the information-processing apparatuses 11 and 21 request the copy source storage devices 10, 20, and 30 to write data into the main logical volumes, the copy source storage devices 10, 20, and 30 first write data into the main logical volumes thereof. In addition, the copy source storage devices 10, 20, and 30 transmit the same data as the write data to copy destination storage devices 10, 20, and 30. Then, the copy destination storage devices 10, 20, and 30 write the received data into the secondary logical volumes and notify that fact to the copy source storage devices 10, 20, and 30. The copy source storage devices 10, 20, and 30 that have received this notification give notice that data writing has been completed to the information-processing apparatuses 11 and 21.

In such a synchronous manner, the information-processing apparatuses 11 and 21 have notice of the completion of data writing after it is confirmed that data is written to both the main logical volumes and secondary logical volumes. Accordingly, in the synchronous manner, the correspondence between the contents of the main logical volumes and the contents of the secondary logical volumes is secured at the time when the information-processing apparatuses 11 and 21 receive notice of the completion. However, the information-processing apparatuses 11 and 21 receive notice of the completion until data is completely written into the secondary logical volume. Thus, in the synchronous manner, response time until the completion notice returns to the information-processing apparatuses 11 and 21 after a data write request is transmitted from information-processing apparatuses 11 and 21 to the copy source storage devices 10, 20, and 30 is generally longer than that in the asynchronous manner.

Meanwhile, in the asynchronous manner, when the information-processing apparatuses 11 and 21 request the copy source storage devices 10, 20, and 30 to write data into the main logical volumes, the copy source storage devices 10, 20, and 30 write data into the main logical volumes. Further, the copy source storage devices 10, 20, and 30 transmit the same data as the write data to the copy destination storage devices 10, 20, and 30. The copy destination storage devices 10, 20, and 30 write the received data into the secondary logical volumes and notify that fact to the copy source storage devices 10, 20, and 30. Here, if the copy source storage devices 10, 20, and 30 write data to the main logical volumes, they immediately transmit the completion notice to the information-processing apparatuses 11 and 21, irregardless of whether data is written to the secondary logical volumes of the copy destination storage devices 10, 20, and 30. Thus, in the asynchronous manner, response time with respect to the information-processing apparatuses 11 and 21 is generally shorter as compared to the synchronous manner. However, the data coincidence between the main logical volumes and the secondary logical volumes is not necessarily secured. Further, in the case of the asynchronous manner, the copy source storage devices 10, 20, and 30 manage data that is not reflected to the secondary logical volumes of the copy destination storage devices 10, 20, and 30.

In this embodiment, a remote pair between the first main logical volume and the third logical volume performs a remote copy in the synchronous manner. Thus, the contents of the first main logical volume are always consistent with the contents of the third logical volume.

[Differential Management Table]

The differential management table 202 shows whether any block of a certain logical volume 109 is updated on the basis of a predetermined time. As shown in FIG. 5, the table is generally recorded in the shared memories 104 of the storage devices 10, 20, and 30 in a bitmap format, and each bit corresponds to a block in the logical volume 109. The differential management table 202 in which an initial state of each item is '0' is recorded in the shared memories 104 of the storage devices 10, 20, and 30. If the storage devices 10, 20, and 30 write data in the logical volumes 109, each of them updates a bit on the differential management table, which indicates a block in which the data is stored, to '1'.

In this embodiment, whether the third storage device 30 updates any block of the third logical volume on the basis of the time when the local pair of the first logical volume is split is recorded in the shared memory 104 of the third storage device 30 as the differential management table 202. As described above, the remote pair between the first main logical volume and the third logical volume is always the 'under pair', thereby performing the remote copy in the synchronous manner. Thus, the differential management table 202 of the third storage device 30 indicates a write history of data recorded in the first main logical volume after the local pair of the first logical volume is split. That is, in the differential management table 202, data in the third logical volume of a block in which '1' is set up is data recorded in the first main logical volume after the local pair of the first logical volume is split. In addition, the first information-processing apparatus 11 backs up the first secondary logical volume to the second logical volume in a state in which the local pair of the first logical volume is split.

In this way, when the first site is damaged, the third storage device 30 makes the second logical volume consistent with the first main logical volume by remotely copying only data in the third logical volume, which is set up to '1' in the differential management table 202 of the third storage device 30, to the second logical volume.

However, when the first site is damaged while the first storage device 10 performs a remote copy from the first secondary logical volume to the second logical volume, the second logical volume has not been updated so as to be consistent with the first main logical volume at the time when the local pair of the first logical volume is split the last time. Thus, the third storage device 30 can make the second logical volume consistent with the first main logical volume only with the differential management table 202 at the time when the first logical volume is split the last time.

Thus, in this embodiment, the third storage device 30 records the differential management table 202 at the time when the local pair of the first logical volume is split the time before last and the last time. Accordingly, when the first site is damaged while the first storage device 11 performs a remote copy from the first secondary logical volume to the second logical volume, the third storage device 30 can make the second logical volume consistent with the first main logical volume using the differential management table 202 recorded at the time when the local pair of the first logical volume is split the time before last.

Figure 7:
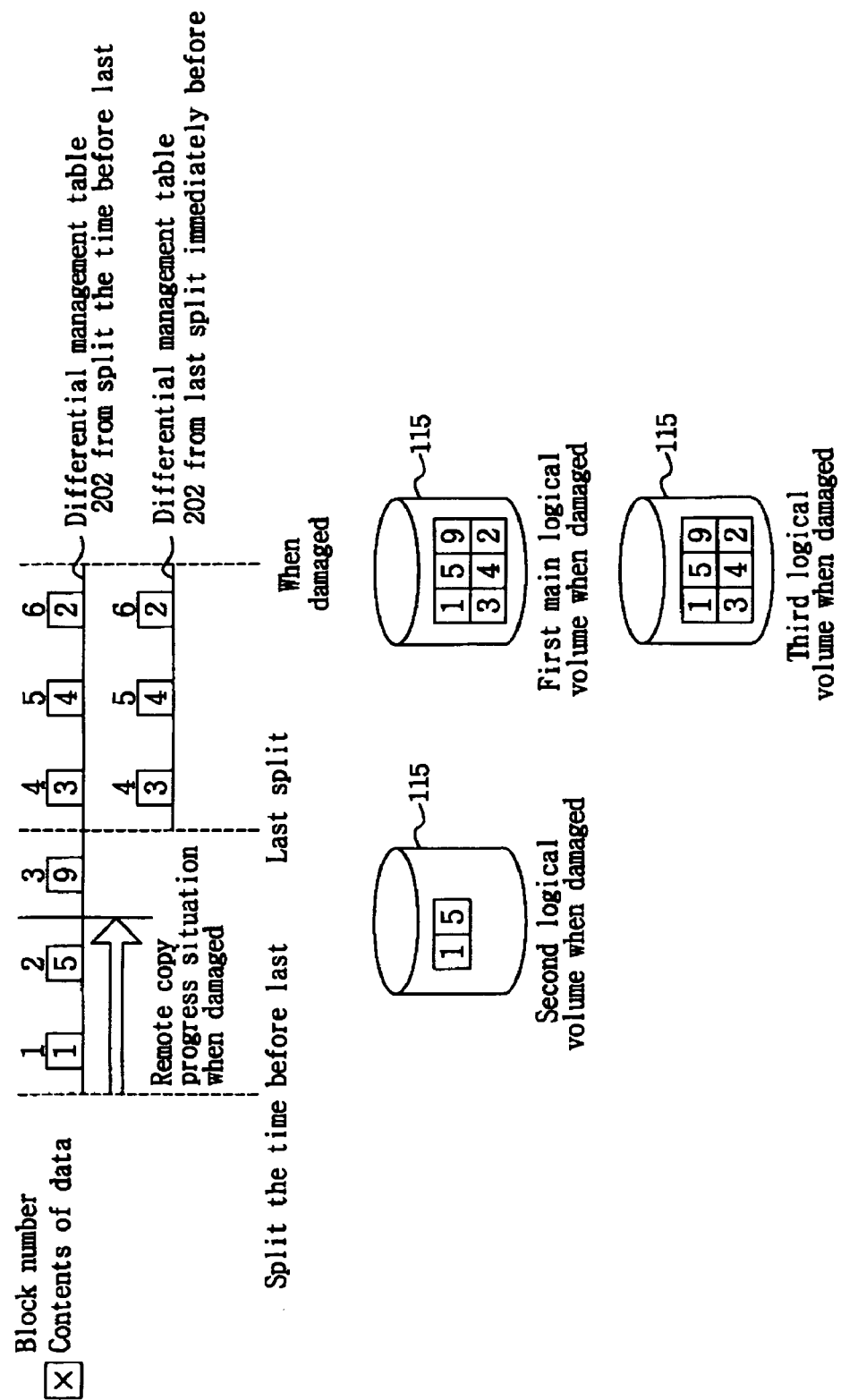
FIG. 7 is a diagram illustrating a differential management table according to the present embodiment.

FIG. 7 shows an example in which the first site is damaged while the first storage device 10 is performing a remote copy from the first secondary logical volume to the second logical volume. In the differential management table 202, '1' is set up with respect to a block of the third logical volume on which the third storage device 30 performs update, and FIG. 7 shows the contents of write data in the logical volume for the sake of convenience in the present invention. As shown in FIG. 7, at the time when it is damaged, update is completed up to the data '5' in the remote copy from the first secondary logical volume to the second logical volume, which is performed by the first storage device 10. However, since the update of the subsequent data '9' is not completed, the second logical volume is not consistent with the first main logical volume at the time when the local pair of the first logical volume is split the last time. Thus, the third storage device 30 remotely copies, to the second logical volume, data '1', '5', '9', '3', '4', and '2' of the blocks 1 to 6 in which '1' is set up in the differential management table at the time when the local pair of the first logical volume is split the time before last. Accordingly, the third storage device 30 can make the second logical volume consistent with the first main logical volume at the time when the first site is damaged.

Further, if the storage devices 10, 20, and 30 receive differential delete requests from the information-processing apparatuses 11 and 21, they update all bits of the differential management tables 202 to '0'. The information-processing apparatuses 11 and 21 may perform the differential delete requests by designating a differential delete start time. In addition, the information-processing apparatuses 11 and 21 can instruct differential deletion in a consistency group unit when the logical volume 109 that performs the update management in the differential management table 202 forms the consistency group.

In this embodiment, the third logical volume has two differential management tables 202, as described above. If the third storage device 30 receives a differential delete request from the first information-processing apparatus 11, it deletes only the differential management table 202 at the time when the local pair of the first logical volume is split the time before last, and begins to record on the differential management table 202 update information at the time when the local pair is newly split.

Transition in General Operation

Figure 8:
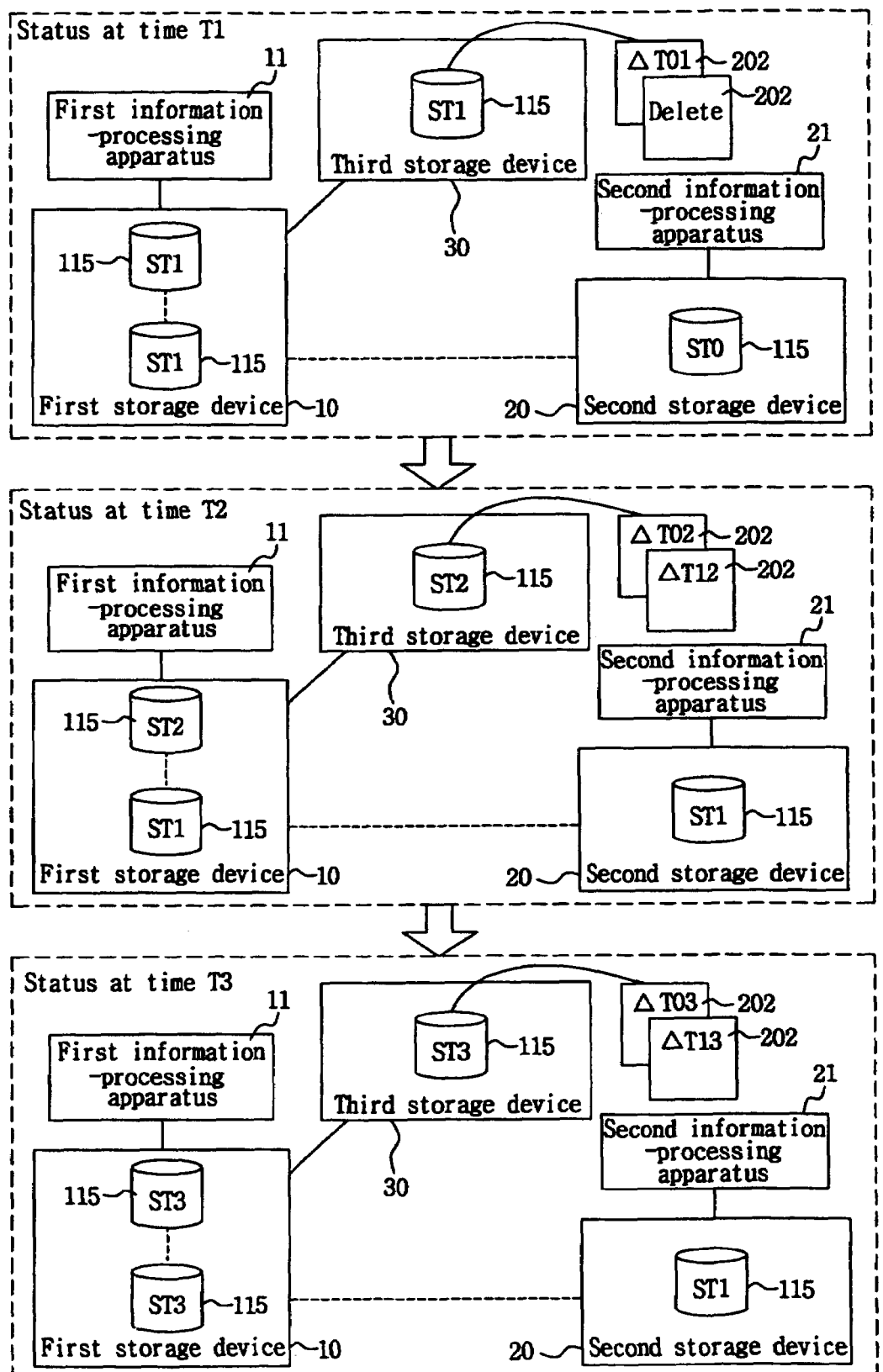
FIG. 8 is a diagram illustrating a change in the state of each storage device when a normal operation is performed at the first site in the information-processing system according to the present embodiment.

FIG. 8 illustrates the transition of a data state in each site at the time T1 to T3 when the first information-processing apparatus 11 operates a normal system. Further, STn written in the logical volume 109 indicates that the logical volume 109 is consistent with the first main logical volume at the time Tn. Further, Δtxy indicates a differential management table 202 from the time Tx to the time Ty.

First, a state at the time T1 will be described. Assuming that the last split time of a local pair in the first logical volume is T0, a state is illustrated in which the first information-processing apparatus 11 splits the local pair of the first logical volume at the time T1. The state is as follows: the local pair of the first logical volume is the 'under split', a remote pair of the first main logical volume and the third logical volume is the 'under pair', and a remote pair of the first secondary logical volume and the second logical volume is the 'under split'. The first information-processing apparatus 11 designates the time T1, which is the same as the split of the first logical volume, and transmits a delete request from the differential management table 202 to the third storage device 30. The third storage device 30 having received the request deletes, at the time T1, the differential management table 202 recorded at the time is when the local pair of the first logical volume is split the time before last. Further, the second logical volume is in the state of the first main logical volume at the time T0.

Next, a state at the time T2 will be described. In this state, the first storage device 10 re-forms a local pair of the first secondary logical volume and the second logical volume according to an instruction from the first information-processing apparatus 11. The first information-processing apparatus 11 monitors the pairing status of a remote pair of the first secondary logical volume and the second logical volume. Then, when the paring status becomes the 'under pair', the first information-processing apparatus 11 instructs the first storage device 10 to split the remote pair.

Finally, a state at the time T3 will be described. In this state, the first information-processing apparatus 11 instructs the first storage device 10 to re-form a local pair of the first logical volume. Then, the first storage device 10 re-forms the local pair of the first logical volume.

As describe above, the transition from the state at the time T1 to the state at the time T3 repeatedly occurs when the first site is not damaged. The operation of the first information-processing apparatus 11 and the third storage device 30 during this transition will be described.

Figure 9:
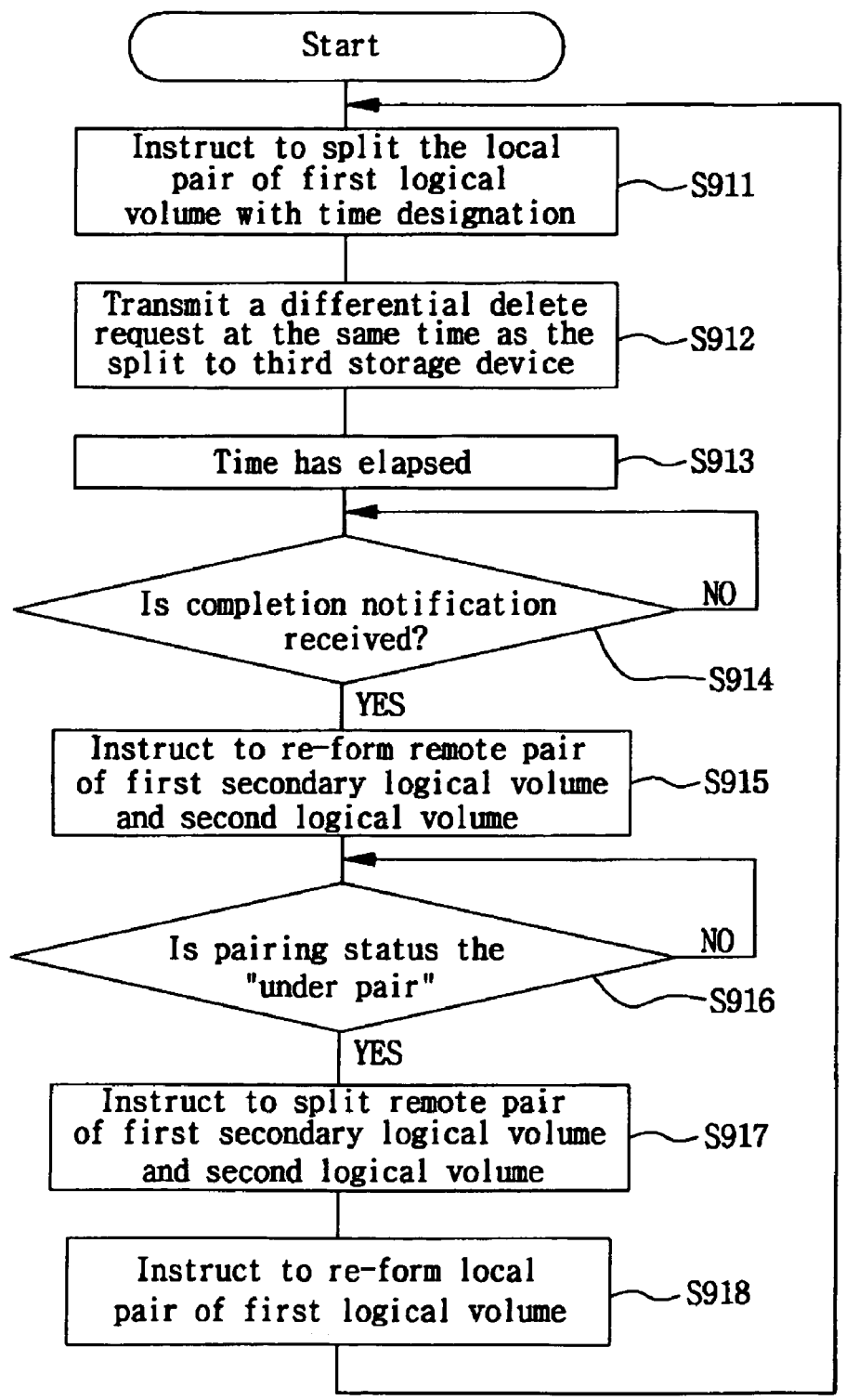
FIG. 9 is a flow diagram explaining a processing flow in a first information-processing apparatus when a normal operation is performed at the first site in the information-processing system according to the present embodiment.

First, the operation of the first information-processing apparatus 11 will be described with reference to FIG. 9. The first information-processing apparatus 11 instructs the first storage device 10 to split the local pair of the first logical volume with time designation (S911). Here, the split is executed on the local pair in a consistency group unit. Further, the first information-processing apparatus 11 transmits to the third storage device 30 a differential delete request in which the same time as the split is set up as a differential delete start time (S912). Further, the differential delete request is performed on the remote pair in the consistency group, which is the same as the local pair on which the split is performed. When the first information-processing apparatus 11 receives split completion notice from the first storage device 10 and differential delete completion notice from the third storage device 30 (S914) after the setup time has elapsed (S913), it instructs the first storage device 10 to re-form the remote pair of the first secondary logical volume and the second logical volume (S915). The first information-processing apparatus 11 monitors the pairing status of the remote pair of the first secondary logical volume and the second logical volume. Then, when the state of the pair becomes the 'under pair' (S916), the first information-processing apparatus 11 instructs the first storage device to split the pair (S917). Subsequently, the first information-processing apparatus 11 instructs the first storage device 10 to re-form the local pair of the first logical volume (S918). The first information-processing apparatus 11 repeatedly executes such a series of processes.

Figure 10A:
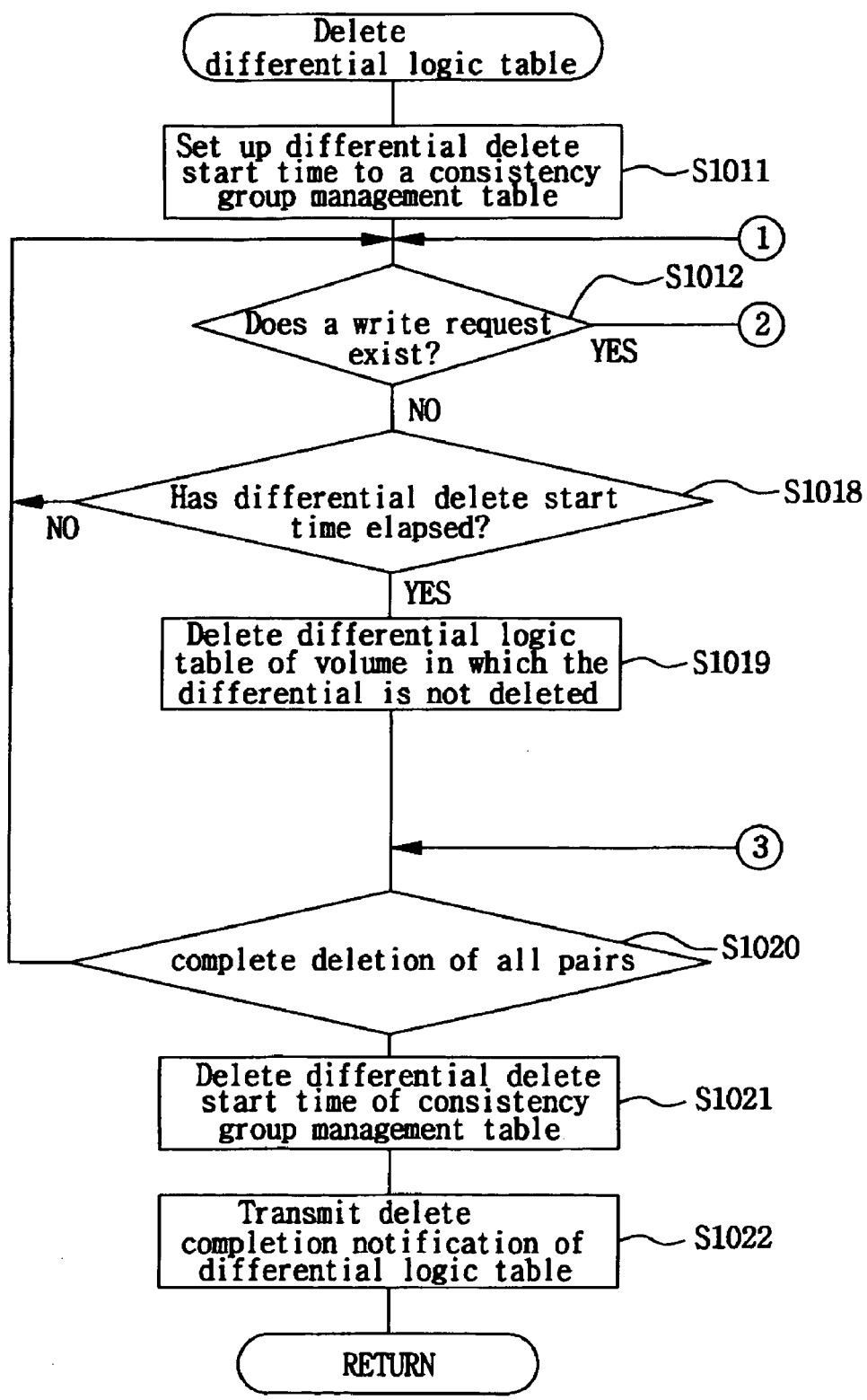
FIGS. 10A and 10B are flow charts explaining a processing flow in a third storage device when a normal operation is performed at the first site in the information-processing system according to the present embodiment.
Figure 10B:
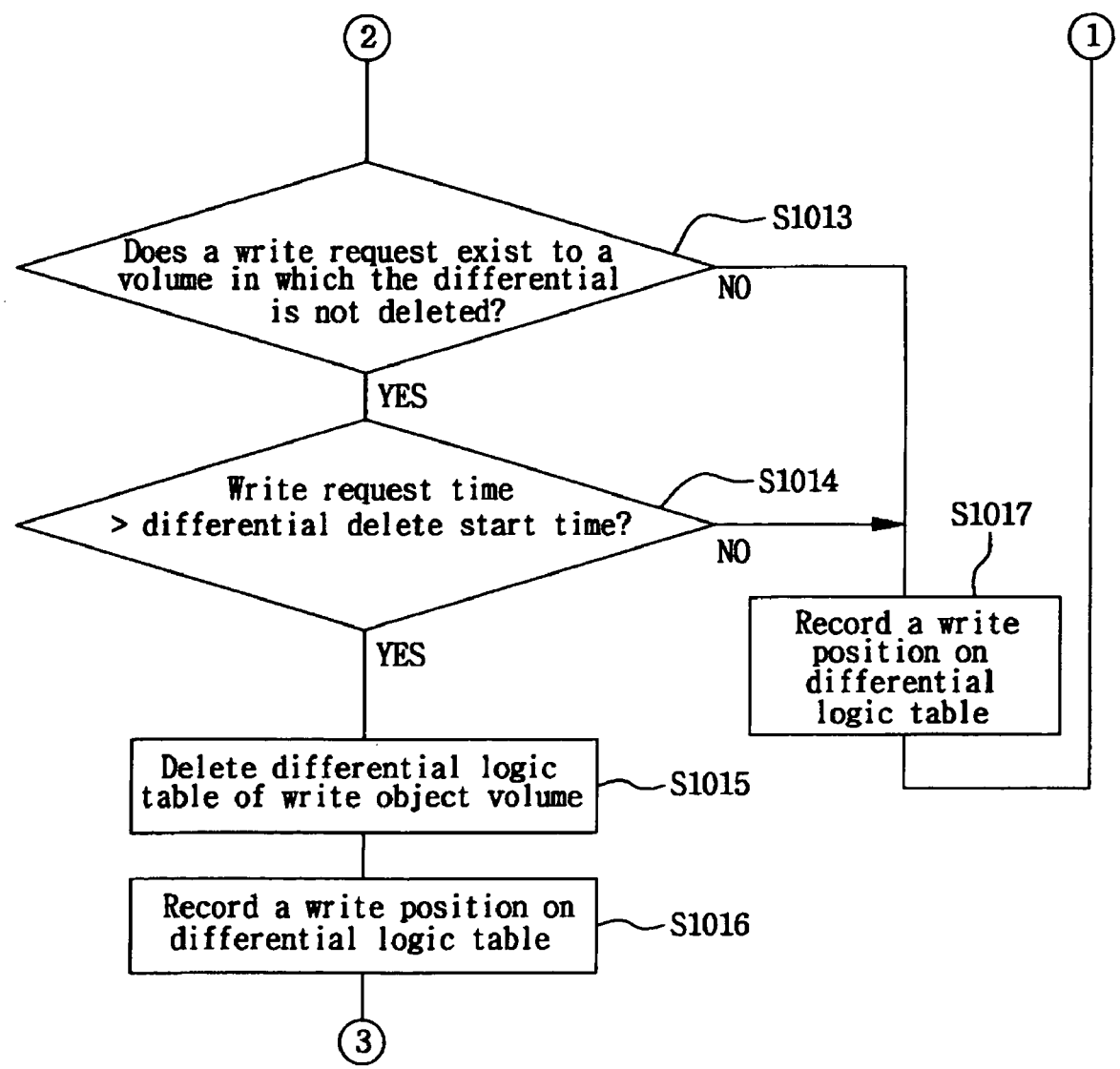

Next, the operation of the third storage device 30 will be described with reference to FIGS. 10A and 10B. When the third storage device 30 receives a differential delete request from the first information-processing apparatus 11, it sets up a differential delete start time to a consistency group management table 200 (S1101). The third storage device 30 monitors a data write request from the first storage device 10 during the differential delete start time (S1012). When the third storage device 30 receives the data write request from the first storage device 10, it confirms whether data is recorded in the logical volume 109 in which the differential management table 202 has not yet been deleted (S1013). If the data writing is performed in the logical volume 109 in which the differential management table 202 has not yet been deleted, the third storage device 30 compares the time set in the write request with the differential delete start time (S1014). When the time set in the write request is later than the differential delete start time, the third storage device 30 first deletes the differential management table 202 of a logical volume 109, which is the target of the write operation (S1015). The third storage device 30 then records the information regarding the write data, for example, a write position on the differential management table 202 (S1016). Further, if a data write request from the first storage device 10 is directed to the logical volume 109 in which the differential management table 202 has already been deleted, the third storage device 30 does not perform the deletion of the differential management table 202 and records the written information on the differential management table 202 (S1017). Further, even though the write is directed to the logical volume 109 in which the differential management table 202 is not deleted, the third storage device 30 does not perform the deletion of the differential management table 202 and records the written information on the differential management table 202 when the time set in the write request is faster than the differential delete start time (S1017).

As such, the third storage device 30 compares the time set up in the write request received from the first storage device 10 with the differential delete start time set up in the differential delete request received from the first information-processing apparatus 11, and performs the data writing on the differential management table 202 and the data deletion from the differential management table 202 in a time sequence. That is, the data writing on the first main logical volume and the split for the local pair of the first logical volume performed by the first storage device 10, and the data writing on the differential management table 202 and the data deletion from the differential management table 202 performed by the third storage device 30 is performed in regular order. Accordingly, it is secured that the differential management table 202 of the third storage device 30 is a write history of data written to the first main logical volume after a time when the local pair of the first logical volume is split.

Further, if the third storage device 30 does not receive a write request from the first storage device 10, it deletes the differential management table 202 of the logical volume 109 which has not yet been deleted (S1019) after the differential delete start time has been elapsed (S1018). Since the third storage device 30 deletes the differential management table 202 in a consistency group unit, it confirms whether the deletion of the differential management tables 202 for all pairs in the consistency group is completed (S1020). If the deletion of the differential management table 202 for all pairs in the consistency group is completed, the third storage device 30 deletes the differential delete start time from the consistency group management table (S1021) and transmits to the first information-processing apparatus 11 a notice that the differential management table 202 is completely deleted (S1022). Further, each logical volume 109 has two differential management tables 202 as described above. Therefore, when the third storage device 30 receives a differential delete request from the first information-processing apparatus 11, it deletes only the differential management table 202 recorded at the time when the local pair of the first logical volume is split the time before last.

[Process when First Site is Damaged]

The operation of making the second logical volume consistent with the first main logical volume in order to operate the second site as a main system when the first site is damaged will be discussed. First, the second information-processing apparatus 21 instructs the second storage device 20 to acquire the paring status of the remote pair of the second logical volume and the first secondary logical volume. The second storage device 20 having received this instruction refers to the pair management table 202 in the shared memory 104 of the second storage device 20 and transmits the contents of the table to the second information-processing apparatus 21.

Next, the second information-processing apparatus 21 instructs the second storage device 20 to form a remote pair in which a third logical volume is a main logical volume and a second logical volume is a secondary logical volume. Further, the second information-processing apparatus 21 transmits to the second storage device 20 whether the remote pair of the second logical volume and the first secondary logical volume was in the 'resynchronization' state.

When the second information-processing apparatus 21 instructs the second storage device 20 to form a pair of the third logical volume and the second logical volume, the second storage device 20 updates the pair management table 202 of the second storage device 20. Further, the second storage device 20 transmits to the third storage device 30 the pair formation instruction and the state of the pair of the second logical volume and the first secondary logical volume received from the second information-processing apparatus 21. When the third storage device 30 receives them, it updates the pair management table 202 of the third storage device 30. Then, the third storage device 30 performs a remote copy from the third logical volume to the second logical volume based on the state of the pair of the second logical volume and the first secondary logical volume, which is received from the second storage device 20.

That is, if the state of the remote pair of the second logical volume and the first secondary logical volume is not the 'resynchronization', the third storage device 30 refers to the differential management table 202 at the time when the local pair of the first logical volume is split the last time. Further, if the state of the remote pair of the second logical volume and the first secondary logical volume is the 'under resynchronization', the third storage device 30 refers to the differential management table 202 at the time when the local pair of the first logical volume is split the time before last. The third storage device 30 remotely copies only the third logical volume block on the referred differential management table 202, in which '1' is set up, to the second logical volume.

Figure 11A:
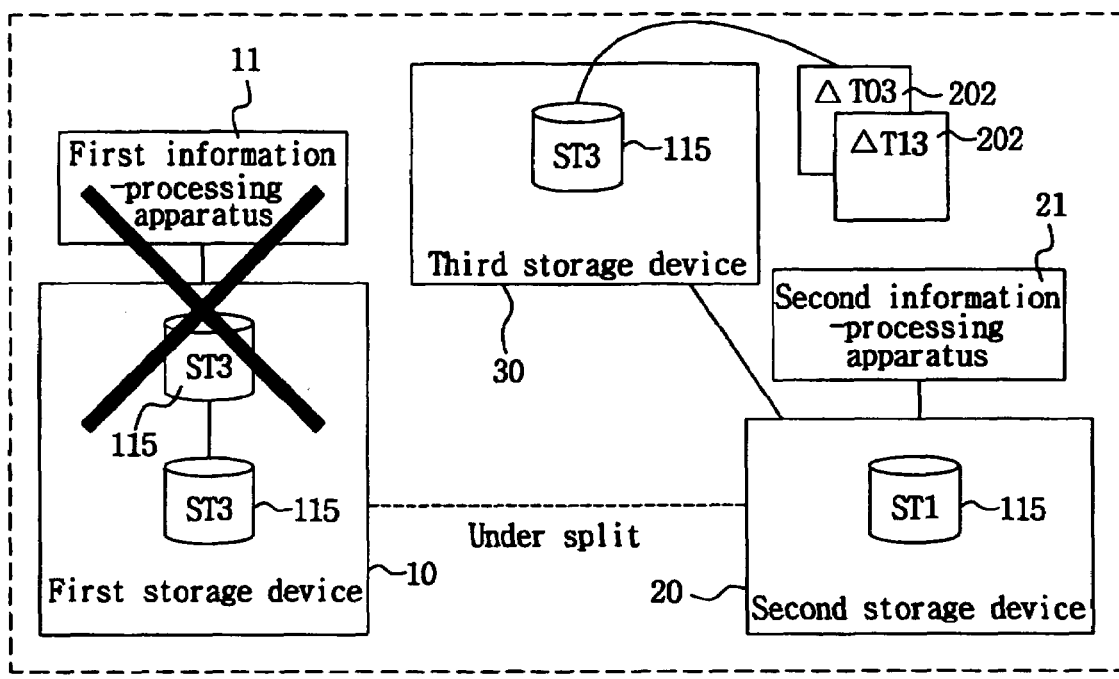
FIGS. 11A and 11B are diagrams illustrating an operation in which a logical volume of a second storage device is made to be consistent with a logical volume of the first storage device in order to shift a second site into use as the normal system in the information-processing system according to the present embodiment.

FIG. 11A illustrates an example in which the remote pair of the second logical volume and the first secondary logical volume is not in the 'resynchronization' state. Assuming that the time when the local pair of the first logical volume is split the time before last is T0 and the time when it is split in the last stage is T1, FIG. 11A illustrates a situation in which the first site is damaged at the time T3. Since the pairing status of the remote pair of the second logical volume and the first secondary logical volume is the 'under split', the third storage device 30 remotely copies the block recorded on the differential management table 202 (ΔT13) at the time T1 from the third logical volume to the second logical volume. Therefore, it is possible to equalize the second logical volume, which is ST3, with the first main logical volume.

Figure 11B:
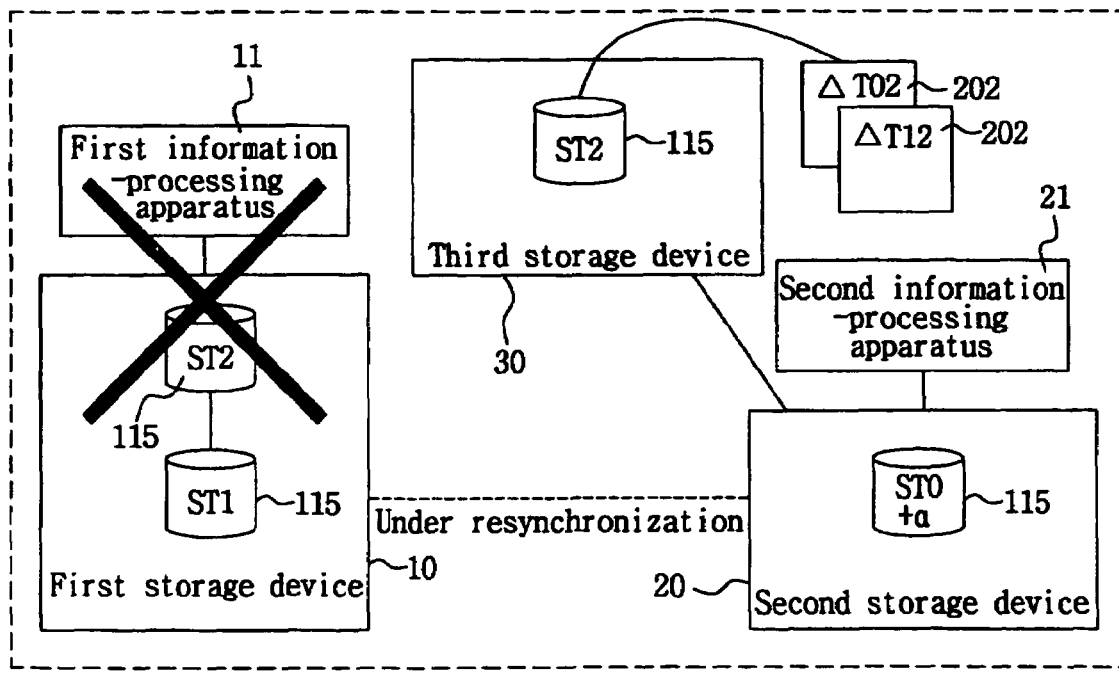

Next, FIG. 11B illustrates an example in which the remote pair of the second logical volume and the first secondary logical volume is in the 'resynchronization' state. Assuming that the time when the local pair of the first logical volume is split the time before last is T0 and the time when it is split in the last stage is T1, FIG. 11B illustrates a situation in which the first site is damaged at the time T2. Since the state of the local pair of the second logical volume and the first secondary logical volume is the 'resynchronization', the third storage device 30 remotely copies the block recorded on the differential management table 202 (ΔT02) at the time T0 from the third logical volume to the second logical volume. Therefore, it is possible to equalize the second logical volume, which is ST2, with the first main logical volume.

In the aforementioned embodiments of the present invention, the embodiments are intended to easy understanding of the present invention, but the present invention is not limited thereto. The present invention may be modified without departing the spirit thereof, and includes its equivalents.

What is claimed is:

1. A method of controlling a storage system comprising a first storage device having a first storage volume provided at a first site, a second storage device having a second storage volume provided at a second site, and a third storage device having a third storage volume provided at a third site, wherein the method includes the steps of:
   storing a copy of data stored in the first storage volume in the second storage volume with an asynchronous remote copy procedure;
   writing the copy of data written in the first storage volume into the third storage volume with a synchronous copy procedure;
   relating data written in the first storage volume after a first time to a storage area of the first storage device;
   controlling by the third storage device to store a first differential management table on which a write history of the data written in the first storage volume is recorded after the first time and a second differential management table on which a write history of the data written in the first storage volume is recorded after a second time subsequent to the first time;
   transferring data related to the storage area of the first storage device from the first storage device to the second storage device with the asynchronous remote copy procedure after the second time; and
   controlling by the third storage device to make contents of the data stored in the second storage volume consistent with contents of the data stored in the third storage volume by using the first differential management table and the third storage volume of the third storage device, if the first site has a disaster.

2. The method of controlling a storage system according to claim 1, wherein the step of controlling by the third storage device to store the first differential management table comprises the steps of:
   controlling by the third storage device to compare time set in a data write request received from the first storage device with the first time; and
   controlling by the third storage device to store the write history of the data in the first differential management table when the write time set in the data write request received from the first storage device is later than the first time.

3. A storage system comprising a first storage device having a first storage volume provided at a first site, a second storage device having a second storage volume provided at a second site, and a third storage device having a third storage volume provided at a third site, wherein the system comprises:
   the first storage device for storing a copy of data stored in the first storage volume in the second storage volume with an asynchronous remote copy procedure;
   the first storage device for writing the copy of data written in the first storage volume into the third storage volume with a synchronous copy procedure;
   the third storage device for controlling to store a first differential management table on which a plurality of write histories of the data written several times in the first storage volume is recorded after a first time and a second differential management table on which a plurality of write histories of the data written several times in the first storage volume is recorded after a second time subsequent to the first time;
   a storage area, in the first storage device, is related to data written in the first storage volume after a first time;
   the first storage device for controlling to transfer data related to the storage area of the first storage device from the first storage device to the second storage device with the asynchronous remote copy procedure after the second time; and
   the third storage device for making contents of the data stored in the second storage volume consistent with contents of the data stored in the third storage volume by using the first differential management table and the third storage volume of the third storage device in the event of a disaster that affects the first site.

4. The storage system according to claim 3, wherein:
   the third storage device compares time set in a data write request received from the first storage device with the first time; and
   the third storage device stores the write history of the data in the first differential management table when the write time set in the data write request received from the first storage device is later than the first time.

5. A storage system, comprising:
   a first disk array system, in a primary site, coupled to a host computer and having a plurality of first disk drive units in which data are stored and a first controller which controls to store data sent from said host computer in a primary volume configured by said first disk drive units,
   a second disk array system, in a remote site, coupled to said first disk array system and having a plurality of second disk drive units in which data are stored and a second controller which receives data of said primary volume from said first disk array system with an asynchronous remote copy procedure and controls to store data received from said first disk array system in a secondary volume configured by said second disk drive units,
   a third disk array system, in a local site, coupled to said first disk array system and having a plurality of third disk drive units in which data are stored and a third controller which receives data of said primary volume from said first disk array system with a synchronous copy procedure and controls to store data received from said first disk array system in a third volume configured by said third disk drive units, a first area, in said third disk array system, for storing a plurality of write histories of data written several times in the third volume as a first differential management table after a first time; and a second area, in said third disk array system for storing a plurality of write histories of the data written into the third volume as a second differential management table after a second time subsequent to the first time; and a third area, in said first disk array system, being related to data written in said primary volume after the first time;

wherein said first disk array system transfers data related to said third area of said first disk array system from said first disk array system to said second disk array system with the asynchronous remote copy procedure after the second time.

6. A storage system according to claim 5, wherein the third disk array system makes contents of data stored in the secondary volume consistent with contents of data stored in the third volume by using said first area and the third volume of said third disk array system in the event of a disaster that affects said primary site.

7. A storage system according to claim 5, wherein said synchronous copy procedure is a copy style that said first disk array system sends acknowledge to said host computer after said third disk array system receives first data sent from said first disk array system, if said first disk array system receives said first data sent from said host computer.

8. A storage system according to claim 5, wherein said asynchronous remote copy procedure is a copy style that said first disk array system sends acknowledge to said host computer without relation to that said second disk array system receives second data sent from said first disk array system, if said first disk array system receives said second data sent from said host computer.

9. A storage system according to claim 5, wherein each of said write histories has information of a position in said third volume, said position in which data are written.

10. A storage system according to claim 5, wherein said data transfer from said first disk array system to said second disk array system with said asynchronous remote copy procedure is acted on a periodic basis.

11. A storage system according to claim 5, wherein said third disk array system sends data which relates to information stored in at least one of said first area and second area to said second disk array system, if said first disk array system has a disaster.

12. A storage system according to claim 5, wherein said synchronous copy procedure is a copy style that said first disk array system sends acknowledge to said host computer after said third disk array system receives first data sent from said first disk array system, if said first disk array system receives said first data sent from said host computer, and wherein said third disk array system stores said write history of said first data in said first area, if said third disk array system receives said first data sent from said first disk array system.

13. A storage system according to claim 5, wherein said third disk array system transfers data related to said write histories after said first time from said third disk array system to said second disk array system, if said first disk array system has a disaster during transferring data from said first disk array system to said second disk array system with an asynchronous remote copy.

14. A storage system according to claim 5, wherein said third disk array system transfers data related to said write histories after said second time from said third disk array system to said second disk array system, if said first disk array system has a disaster after transferring data from said first disk array system to said second disk array system with an asynchronous remote copy.

15. A storage system according to claim 5, wherein said third disk array system, by using said first area, can transfer lesser amount of data that needs to be transferred to said second disk array system than all data stored in said third volume, if said first disk array system has a disaster.

16. A storage system according to claim 5, wherein said third disk array system can minimize amount of data that needs to be transmitted to said second disk array system by using said first area, if said first disk array system has a disaster.

17. A storage system, comprising:

a first disk array system, in a primary site, coupled to a host computer and having a plurality of first disk drive units in which data are stored and a first controller which controls to store data sent from said host computer in a primary volume configured by said first disk drive units, a second disk array system, in a remote site, coupled to said first disk array system and having a plurality of second disk drive units in which data are stored and a second controller which receives data of said primary volume from said first disk array system with an asynchronous remote copy procedure and controls to store data received from said first disk array system in a secondary volume configured by said second disk drive units, a third disk array system, in a local site, coupled to said first disk array system and having a plurality of third disk drive units in which data are stored and a third controller which receives data of said primary volume from said first disk array system with a synchronous copy procedure and controls to store data received from said first disk array system in a third volume configured by said third disk drive units, a first area, in said third disk array system, for storing a plurality of write histories of data written in the third volume several times after a first time; and a second area, in said third disk array system, for storing a plurality of write histories of data written into the third volume several times after a second time subsequent to the first time; and a third area, in said first disk array system, is related to data written in said primary volume after the first time;

wherein said first disk array system transfers data, which are related to said third area of said first disk array system and correspond to said write histories in said first area of said third disk array system, from said first disk array system to said second disk array system with the asynchronous remote copy procedure; and wherein the third disk array system makes contents of data stored in the secondary volume consistent with contents of data stored in the third storage volume by using said first area and the third volume of said third disk array system in the event of a disaster that affects said primary site.

18. A storage system according to claim 17, wherein said first area is a bitmap, and said second area is a bitmap.

19. A storage system according to claim 17, wherein said synchronous copy procedure is a copy style that said first disk array system sends acknowledge to said host computer after said third disk array system receives first data sent from said first disk array system, if said first disk array system receives said first data sent from said host computer.

20. A storage system according to claim 17, wherein said asynchronous remote copy procedure is a copy style that said first disk array system sends acknowledge to said host computer without relation to that said second disk array system receives second data sent from said first disk array system, if said first disk array system receives said second data sent from said host computer.

21. A storage system according to claim 17, wherein each of said write histories has information of a position in said third volume, said position in which data are written.

22. A storage system according to claim 17, wherein said data transfer from said first disk array system to said second disk array system with said asynchronous remote copy procedure is acted on a periodic basis.

23. A storage system according to claim 17, wherein said third disk array system sends data which relates to information stored in at least one of said first area and second area to said second disk array system, if said first disk array system has said disaster.

24. A storage system according to claim 17, wherein said synchronous copy procedure is a copy style that said first disk array system sends acknowledge to said host computer after said third disk array system receives first data sent from said first disk array system, if said first disk array system receives said first data sent from said host computer, and wherein said third disk array system stores said write history of said first data in said first area, if said third disk array system receives said first data sent from said first disk array system.

25. A storage system according to claim 17, wherein said third disk array system can minimize amount of data that needs to be transmitted to said second disk array system by using said first area, if said first disk array system has said disaster.

26. A storage system according to claim 17, wherein said third disk array system sends data which relates to information stored in at least one of said first area and second area to said second disk array system, if said first disk array system has said disaster.

27. A storage system according to claim 17, wherein said third disk array system transfers data related to at least one of said write histories from said third disk array system to said second disk array system, if said first disk array system has said disaster during transferring data from said first disk array system to said second disk array system with an asynchronous remote copy.

28. A storage system according to claim 17, wherein said third disk array system transfers data related to said write histories of said second area of said third disk array system from said third disk array system to said second disk array system, if said first disk array system has said disaster after transferring data from said first disk array system to said second disk array system with an asynchronous remote copy.

29. A storage system according to claim 17, wherein said third disk array system, by using said first area, can transfer lesser amount of data that needs to be transferred to said second disk array system than all data stored in said third volume, if said first disk array system has said disaster.

30. A method of controlling a storage system, wherein the storage system comprises a first disk array system including a first storage volume provided at a first site, a second disk array system including a second storage volume provided at a second site, and a third disk array system including a third storage volume provided at a third site, wherein the method includes steps of:

writing data from a host computer coupled to the first disk array system to the first storage volume;

transmitting the data written to the first storage volume from the first disk array system to the third disk array system synchronously with writing the data from the host computer to the first storage volume, to store the data in the third storage volume;

managing data written to the first storage volume after a first time as data to be transmitted to the second disk array system after a second time, which is subsequent to the first time;

transmitting the data, which are managed as data to be transmitted to the second disk array system after the second time, from the first disk array system to the second disk array system after the second time, to store the data in the second storage volume;

managing differential management tables including a first differential management table and a second differential management table by the third disk array system, wherein storing location information of data written in the third storage volume, which data are written to the first storage volume after the first time and transmitted from the first disk array system to the third disk array system, is recorded on the first differential management table, and storing location information of data written in the third storage volume, which data are written to the first storage volume after the second time and transmitted from the first disk array system to the third disk array system, is recorded on the second differential management table, and controlling, by the third disk array system, to transmit a part of data stored in the third storage volume to the second disk array system to store the part of data in the second storage volume by using the differential management tables, if the first site is damaged.

31. A storage system comprising:

a first disk array system, in a primary site, coupled to a host computer, wherein the first disk array system includes a plurality of first disk drive units, in which data are stored, and a first controller, which is configured to store data written from the host computer in a primary volume configured by the first disk drive units;

a second disk array system, in a remote site, coupled to the first disk array system, wherein the second disk array system includes a plurality of second disk drive units, in which data are stored, and a second controller, which is configured to receive data of the primary volume, which data are sent from the first disk array system by an operation of asynchronous remote copy procedure, and store the data received from the first side array system in a secondary volume configured by the second disk drive units; and a third disk array system, in a local site, coupled to the first disk array system, wherein the third disk array system includes a plurality of third disk drive units, in which data are stored, and a third controller, which is configured to receive data of the primary volume, which data are sent from the first disk array system by an operation of synchronous remote copy procedure and store the data received from the first disk array system in a third volume configured by the third disk drive units, wherein the third disk array system includes a memory area including a first area for storing location information relating to locations in the third volume, in which locations data written to the primary volume after a first time and sent from the first disk array system to the third disk array system by an operation of the synchronous remote copy procedure are stored, and a second area for storing location information relating to locations in the third volume, in which locations data written to the primary volume after a second time and sent from the first disk array system to the third disk array system by an operation of the synchronous remote copy procedure are stored, wherein the second time is subsequent to the first time, and wherein the first disk array system is configured to manage data written to the primary volume between the first time and the second time as data to be transmitted from the first disk array system to the second disk array system by an operation of the asynchronous remote copy procedure after the second time.

32. A storage system according to claim 31, wherein the third disk array system is configured to transmit a part of data stored in the third volume to the second disk array system by using location information stored in the memory area, when the primary site is damaged.

33. A storage system according to claim 32, wherein the third disk array system is configured to select data stored in locations related to the location information stored in the memory area, and transmit selected data to the second disk array system, when the primary site is damaged.

34. A storage system according to claim 31, wherein the third disk array system is configured to clear location information stored in the first area after completion of transmission of the data, which are managed as data to be transmitted to the second disk array system after the second time.

35. A storage system according to claim 31, wherein the third disk array system is configured to transmit a lesser amount of data than all of the data stored in the third volume to the second disk array system by using location information stored in the memory area, if the primary site is damaged.

36. A storage system according to claim 31, wherein the third disk array system is configured to reduce an amount of data, that needs to be transmitted to the second disk array system, if the primary site is damaged, by using the memory area.

37. A storage system according to claim 31, wherein in each of the first area and the second area of the third disk array system, a bitmap is configured, on which the location information relating to locations in the third volume is recorded.

38. A storage system according to claim 31, wherein in the synchronous remote copy procedure, the first disk array system receives the data written from the host computer to the primary volume, transmits the data to the third disk array system, and sends an acknowledgement to the host computer after the third disk array system receives the data from the first disk array system.

39. A storage system according to claim 31, wherein in the asynchronous remote copy procedure, the first disk array system receives the data written from the host computer to the primary volume, transmits the data to the second disk array system, and sends an acknowledgement to the host computer regardless of whether the second disk array system receives the data transmitted from the first disk array system.

40. A storage system according to claim 31, wherein after the second time, the first disk array system is configured to transmit the data written to the primary volume between the first time and the second time to the second disk array system, and manage data written to the primary volume after the second time as data to be transmitted from the first disk array system to the second disk array system after completion of transmission of the data written to the primary volume between the first time and the second time.

41. A system for storing data comprising:

a first storage apparatus including a plurality of first disks and a first controller coupled to the plurality of first disks, wherein a first logical volume is configured by the first disks;

a second storage apparatus coupled to the first storage apparatus, wherein the second storage apparatus includes a plurality of second disks and a second controller coupled to the plurality of second disks, and a second logical volume for storing a copy of data stored in the first logical volume is configured by the second disks; and a third storage apparatus coupled to the first storage apparatus, wherein the third storage apparatus includes a plurality of third disks and a third controller coupled to the plurality of third disks, and a third logical volume for storing a copy of data stored in the first logical volume is configured by the third disks, wherein when write data to the first logical volume are received at the first storage apparatus, the write data are stored in the first logical volume, transmitted to the second storage apparatus by an operation of asynchronous remote copy procedure to store in the second logical volume, and transmitted to the third storage apparatus by an operation of synchronous remote copy procedure to store in the third logical volume, wherein the first storage apparatus manages a first group of write data, which are received at the first storage apparatus before a first trigger, as write data to be transmitted to the second storage apparatus by an operation of the asynchronous remote copy procedure, and manages a second group of write data, which are received at the first storage apparatus after the first trigger, as write data to be transmitted to the second storage apparatus by an operation of the asynchronous remote copy procedure after completion of transmission of write data of the first group from the first storage apparatus to the second storage apparatus, wherein the third storage apparatus records location information including first location information and second location information, wherein the first location information is related to locations in the third volume, in which locations write data of the first group received from the first storage apparatus are stored, and wherein the second location information is related to locations in the third volume, in which write data of the second group received from the first storage apparatus are stored, and wherein the third storage apparatus clears the first location information after the completion of the transmission of write data of the first group from the first storage apparatus to the second storage apparatus.

42. A system for storing data according to claim 41, wherein the third storage apparatus clears the first location information before transmission of write data of the second group from the first storage apparatus to the second storage apparatus.

43. A system for storing data according to claim 41, wherein the third storage apparatus includes a first bitmap, in which location information including the first location information is recorded, and a second bitmap, in which location information including the second location information is recorded.

44. A system for storing data according to claim 41, wherein when the first site is damaged, the third storage apparatus selects a part of write data of the third logical volume according to the location information and transmits selected write data to the second storage apparatus to store the selected write data in the second logical volume.

45. A system for storing data according to claim 41, wherein when the first site is damaged, the third storage apparatus selects write data stored in locations specified by using the location information, and transmits selected write data to the second storage apparatus to store the selected write data in the second logical volume.

46. A system for storing data according to claim 41,
wherein after a second trigger after the completion of transmission of write data of the first group from the first storage apparatus to the second storage apparatus, the first storage apparatus manages the second group of write data as write data to be transmitted to the second storage apparatus by an operation of the asynchronous remote copy procedure, and manages a third group of write data, which are received at the first storage apparatus after the second trigger, as write data to be transmitted to the second storage apparatus by an operation of the asynchronous remote copy procedure after completion of transmission of write data of the second group frome first storage apparatus to the second storage apparatus, and
wherein after clearing the first location information, the third storage apparatus records third location information included in the location information, wherein the third location information is related to locations in the third logical volume, in which locations write data to the third group received from the first storage apparatus are stored.

47. A system for storing data according to claim 46,
wherein the third storage apparatus includes a first bitmap, in which location information including the first location information is recorded, and a second bitmap, in which location information including the second location informatin is recorded,
wherein the third storage apparatus clears location information recorded in the first bitmap after completion of the transmission of write data of the first group from the first storage apparatus to the second storage apparatus, and before the transmission of write data of the second group from the first storage apparatus to the second storage apparatus, and
wherein the third storage apparatus records the third location information in the first bitmap after clearing the location information recorded in the first bitmap.

48. A systemm for storing data according to claim 46, wherein the third storage apparatus clears the first location information at synchronous timing with the second trigger.

49. A system for storing data according to claim 41, wherein the third storage apparatus receives an instruction for clearing the first location information from the storage apparatus, and clears the first location information according to the instruction.

* * * * *